United States Patent [19]

Laing

[11] Patent Number: 4,728,268
[45] Date of Patent: Mar. 1, 1988

[54] ROTODYNAMIC PUMP

[76] Inventor: Karsten Laing, 632 Marsat Ct., Chula Vista, Calif. 92011

[21] Appl. No.: 891,807

[22] Filed: Jul. 29, 1986

Related U.S. Application Data

[63] Continuation-in-part of Ser. No. 667,653, Nov. 2, 1984, abandoned.

[51] Int. Cl.[4] .................. F04B 17/00; F04B 35/04
[52] U.S. Cl. .................................................. 417/420
[58] Field of Search ............. 417/420, 365, 366, 371, 417/423 R; 310/90, 91, 166, 86, 87, 254, 217, 218, 104, 52, 54, 51, 62, 63; 384/108, 109, 240, 241, 245, 126

[56] References Cited

U.S. PATENT DOCUMENTS

| | | | |
|---|---|---|---|
| 3,723,029 | 3/1973 | Laing | 310/104 |
| 3,741,690 | 6/1973 | Laing | 417/420 |
| 3,846,050 | 11/1974 | Laing | 417/420 |
| 4,002,936 | 1/1977 | Laing | 417/424 |
| 4,035,108 | 7/1977 | Laing | 417/423 R |
| 4,043,706 | 8/1977 | Walker | 417/420 |
| 4,072,446 | 2/1978 | Walker | 417/420 |
| 4,352,646 | 10/1982 | Laing et al. | 417/420 |
| 4,462,752 | 7/1984 | Laing | 417/420 |
| 4,580,335 | 8/1986 | Laing et al. | 417/420 |

FOREIGN PATENT DOCUMENTS 2135529  1/1980  Fed. Rep. of Germany ...... 417/420

*Primary Examiner*—Leonard E. Smith
*Assistant Examiner*—Donald E. Stout
*Attorney, Agent, or Firm*—Pennie & Edmonds

[57] ABSTRACT

The invention relates to canned pumps which form a unit with a spherical electric motor wherein the discharge is guided from one axial end to the other.

18 Claims, 4 Drawing Figures

ROTODYNAMIC PUMP

This application is a C.I.P. of Ser. No. 667,653, filed Nov. 2, 1984, now abandoned.

BACKGROUND OF THE INVENTION

Pumps conveying the liquid coaxially through the driving electric motor are shown in U.S. Pat. No. 3,667,870. The disadvantage of these pumps is caused by the hollow shaft of the motor. Its diameter should be as small as possible to lower friction in the bushings and, on the other hand, as large as possible to form an unobstructed cross section for the liquid conveyed.

A second design of pumps, described in U.S. Pat. No. 3,846,050, is characterized by the magnetic gap between the stator and the rotor fulfilling two functions. It transfers energy between the driving and the driven part of the motor and acts at the same time as its bearing. The stator and the rotor are the sliding partners of said bearing. These pumps did not find any practical pumps the magnetic gap between stator and rotor follows a spherical surface. The rotating part is supported by a spherical step bearing so that shafts and bushings are not necessary.

To pivot a rotor on a single spherical step bearing requires continuous axial forces directed toward the step bearing. These forces are provided by the axial vector of the magnetic forces generated by the stator. All spherical pumps require this magnetic force.

A disadvantage of these pumps is the fact that the hydraulic thrust produced by the pressure generated by the impeller acts in opposition to the magnetic forces. When the electricity is switched off, the magnetic force of the electrical motor disappears immediately. In contrast, the hydraulic thrust, caused by the pressure generated by the rotating impeller, disappears slowly with decreasing rpm of the impeller. These remaining hydraulic forces cause the rotor to lift away from the step bearing after the motor is electrically switched off.

A further disadvantage of all spherical pumps is the tilt of the rotor-impeller-unit. The impeller is exposed to radial forces which are not equally distributed over the circumference of the impeller caused by the non-uniform pressure distribution within the spiral housing. Therefore, the degree of tilt depends upon the throttling of the discharged fluid. Any tilt reduces the mechanical as well as the electrical efficiency.

The main drawback is insufficient cooling of the windings. Spherical pumps have stators composed of pole pieces extending through the windings arranged in disc shaped layers. The pole pieces are relatively long in the axial direction. All waste heat of the windings is conducted to the pump housing through the limited cross section of the pole pieces. Therefore, the heat flux causes high winding temperatures. The surface conducting and dissipating the heat increases by the square of the linear dimension while the heat produced by the winding increases by the fourth power. This is the reason why spherical pumps are not suited for higher power levels.

Spherical pumps therefore found application only in the range of fractional horsepower performance.

SUMMARY OF THE INVENTION

The invention overcomes all above mentioned disadvantages. Aim of the invention is: To combine the advantages of spherical pumps with highly effective cooling, with stable support of the rotor, and means to prevent tilting of the impeller.

In order to achieve these improvements, the invention makes use of the following features:

(a) Instead of supporting the rotor by a concave bearing cap and a ball opposite to the inlet region of the pump, the invention supports the impeller from the inlet region.

(b) In contrast to current spherical pumps where the bearing is located opposite the suction conduit, the invention places the bearing in the suction conduit which is surrounded by the motor windings.

(c) Also in contrast to current spherical pumps, the rotor has a bore forming part of the suction conduit.

(d) Within this bore, the bearing is positioned and its diameter is small enough to permit nearly unobstructed fluid flow.

(e) In contrast to current spherical pumps where the rotor is supported by a bearing, the invention supports the impeller by the bearing, and the rotor is mounted on the impeller.

(f) The center of rotation (62) is not as previously implemented, coinciding with the equator, but is positioned within the spherical portion of the separation wall.

(g) The separation wall comprises the magnetic gap portion and, in addition, the suction conduit.

(h) The opening of the spherical part of the separation wall may have a smaller diameter than the maximum diameter of the sphere.

(i) The ball is fixed on a pedestal which itself is fixed to the wall of the suction conduit.

(j) The windings, being arranged around the separation wall, and having high thermal conductivity, permit favorable heat dissipation to the fluid conveyed.

The design according to the invention overcomes the disadvantage of the design shown in U.S. Pat. No. 3,667,870 because the pump does not require a shaft.

The pump also overcomes the disadvantages described in U.S. Pat. No. 3,667,870 because the pump does not require a shaft.

The pump also overcomes the disadvantages described in U.S. Pat. No. 3,846,050 because the diameter of the ball is at most one-fifth of the diameter of the rotor. The friction of a spherical bearing with the same viscosity of the lubricant (being the liquid conveyed) follows the equation:

$$M = \pi/2 \cdot \omega \cdot R^4$$

M = torque
$\omega$ = angular velocity
R = radius of the sliding region of the bearing According to this equation, the bearing friction caused by the shear forces in the bearing of the invention is 625 times smaller than the shear forces produced by the rotor in a pump according to U.S. Pat. No. 3,846,050, if both pumps are designed with the same diameter. In reality the advantage in saving friction losses is even larger because the rotor of the pump according to the invention with given diameter will be considerably longer and produces therefore higher torque in contrast to the rotor of the pumps according to U.S. Pat. No. 3,846,050.

The main advantage over pumps as described in U.S. Pat. No. 4,352,646 result from the arrangement of the windings around the separation wall permitting optimal heat dissipation.

The rotor extends to both sides of that plane of rotation in which the center of rotation of the ball is situated. The larger extension lies on the suction side causing a magnetic thrust in the direction of the suction side. Therefore the magnetic thrust and the hydraulic thrust act in the same direction. This prevents the rotor-impeller-unit from lifting off the ball at the moment the rotor is switched off. To suspend the rotor-impeller-unit while not rotating, a stationary stub shaft, attached to the housing, extends to form a working clearance with the back side of the rotating bearing cap. The separation wall separates the dry part with stator and windings from the wet part. The pressure side of the pump is formed by a lid with a flange in its center. This design causes a uniform flow pattern around the impeller preventing tilting due to hydraulic forces.

The windings are arranged around the separation wall. The pole pieces penetrate the windings and are magnetically connected to a yoke. Said yoke is in contrast to normal induction motors arranged axially beside the windings.

DESCRIPTION OF THE DRAWINGS

The invention shall be described by the following figures.

DETAILED DESCRIPTION OF THE PREFERRED EMBODIMENTS

Figure 1:
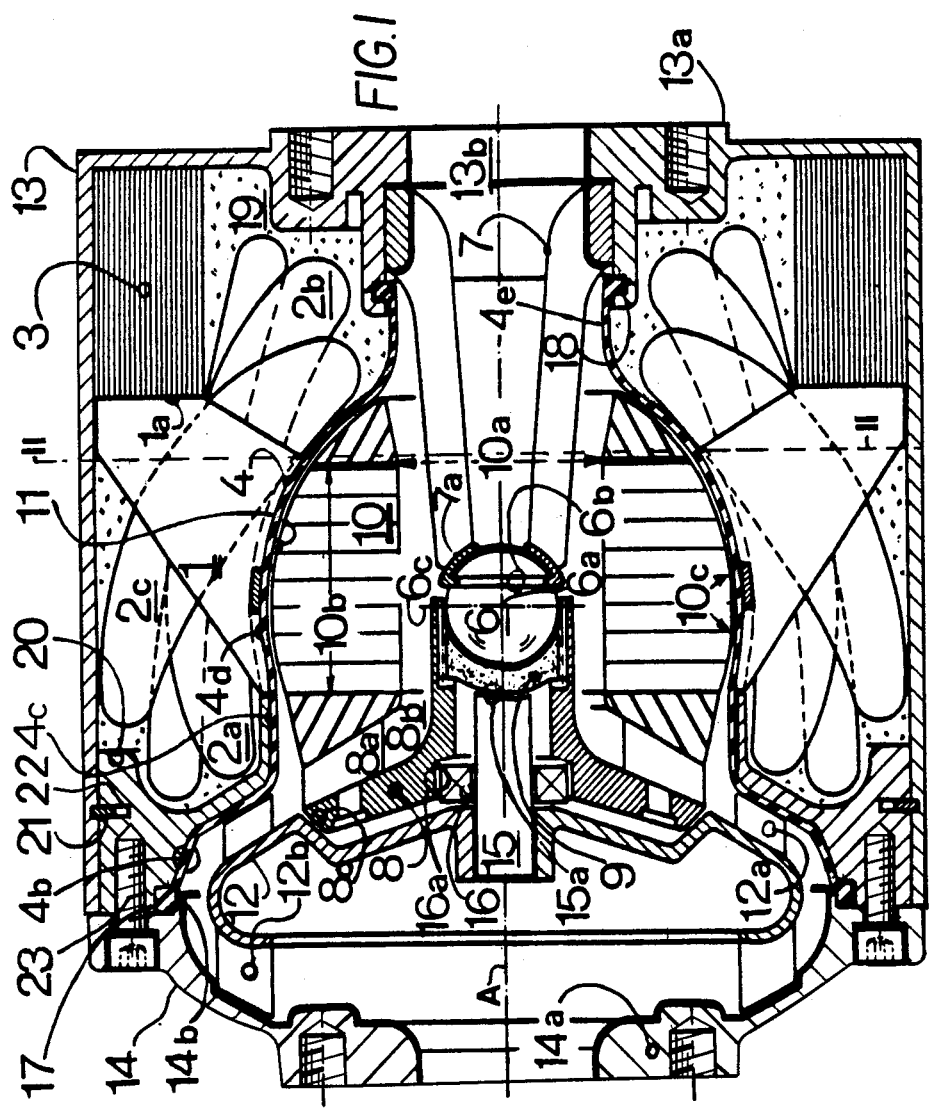
FIG. 1 shows a cross section along the axis of rotation through a pump-motor-unit.
Figure 2:
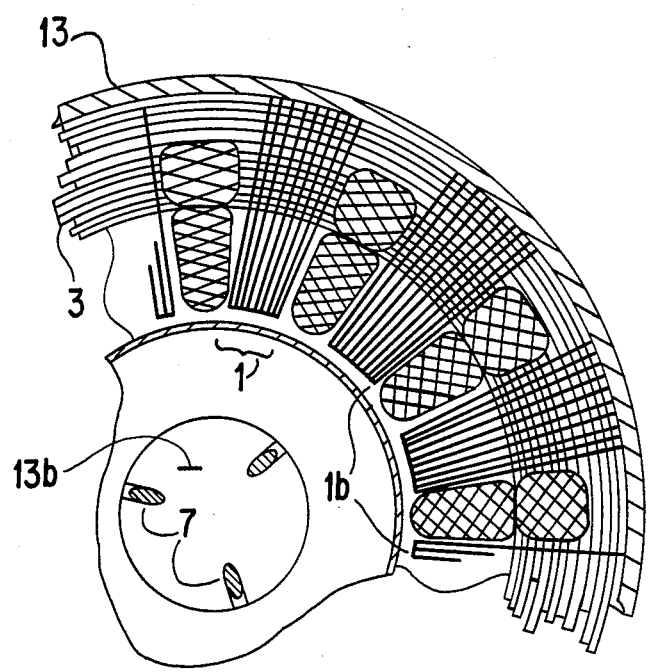
FIG. 2 shows a segment of a cross section in the plane of rotation following the dotted line II—II in FIG. 1.

The pump in FIGS. 1 and 2 consists of
a stator, built from the pole pieces 1, penetrating the coils the winding and a yoke 3,
a separation wall 4 to separate the stator from the wet part,
the ball 6, mounted on a stationary pedestal 7,
an impeller 8 with a bearing cap 9,
the vanes 8a carrying the rotor 10, forming a spherical magnetic gap 11 with the separation wall 4,
guide wheel 12,
a motor housing 13, and
a pump housing 14.

The fluid conveyed enters through flange 13a into the suction conduit 4e, through the bore 10a of the rotor 10 into the inlet region 8b of the impeller 8. It leaves the vanes 8a and passes the bucket-ring 12a to convert the angular momentum into pressure, it then passes the bucket-ring 12b and will be expelled through flange 14a. The periphery 8c of the impeller 8 is spherically shaped and forms a narrow working clearance with the stationary guide wheel 12. A stub shaft 15 mounted in the center region of said guide wheel 12 forms a working clearance 15a with the convex shaped outer surface of the bearing cap 9. A rotating, mounted ring 16 forms a wide clearance 16a with a recess in the impeller 8. Only if the impeller-rotor-unit 8, 10 starts tumbling, does the ring 16 limit the angle of tumbling. The ball 6 with the center of rotation 6a has a groove 6b, and a shell 7a is crimped into this groove 6b.

The separation wall 4 is funnelshaped and divided into five regions. First, the sealing region between the pumphousing 14 and the separation wall 4 is made up to rim 14b and an O-ring 17. Second, the pressure compartment comprises the tapering area 4b together with the pumphousing 14. Third is a cylindrical section 4c, its inner diameter identical with the largest diameter of the rotor 10. Fourth, the separation wall widens to an amount equivalent to the magnetic gap 11, forming the spherical portion 4d, said rotor having cylindrical portion 10c on both sides of the equatorial plane 6c. Fifth, a cylindrical portion 4e forms part of the suction conduit.

The motor housing 13 of the stator 1, 2, 3 is cup-shaped with an inlet opening 13b and the flange portion 13a. An O-ring 18 seals the separation wall 4 against the housing 13. In the annular space between the housing 13 and the separation wall 4, the stator 1, 2, 3 is arranged. The coils 2a, 2b, 2c of the winding are in close contact with the separation wall 4. The pole pieces 1 extend over a length identical with the length of the iron part 10b of the rotor 10. The pole pieces are made of staggered packs of sheet metal plates, each having one edge 1a running perpendicular to the axis A. The yoke 3 is built as a spiral, wound up from a long sheet metal strip. The annular surface facing the edges 1a is ground. The remaining space inside said annular space is filled with a thermally conductive resin 19. On the pressure side of the pump is a conical ring 20 from good heat conductive material like aluminum fixed by a snap ring 21 arranged in the groove 22. The pump housing 14 is fixed by screws 23 to the conical ring 20. The stator is enclosed by the cylindrical wall of the motor housing 13. The pole pieces 1 are evenly distributed over the circumference of the spherical section 4d of the separation wall 4 and radially aligned. Each pole piece consists of a stack of sheet metal pieces 1b. The curbed edges of these sheet metal pieces 1b facing the rotor 10 follow the magnetic gap 11.

Figure 3:
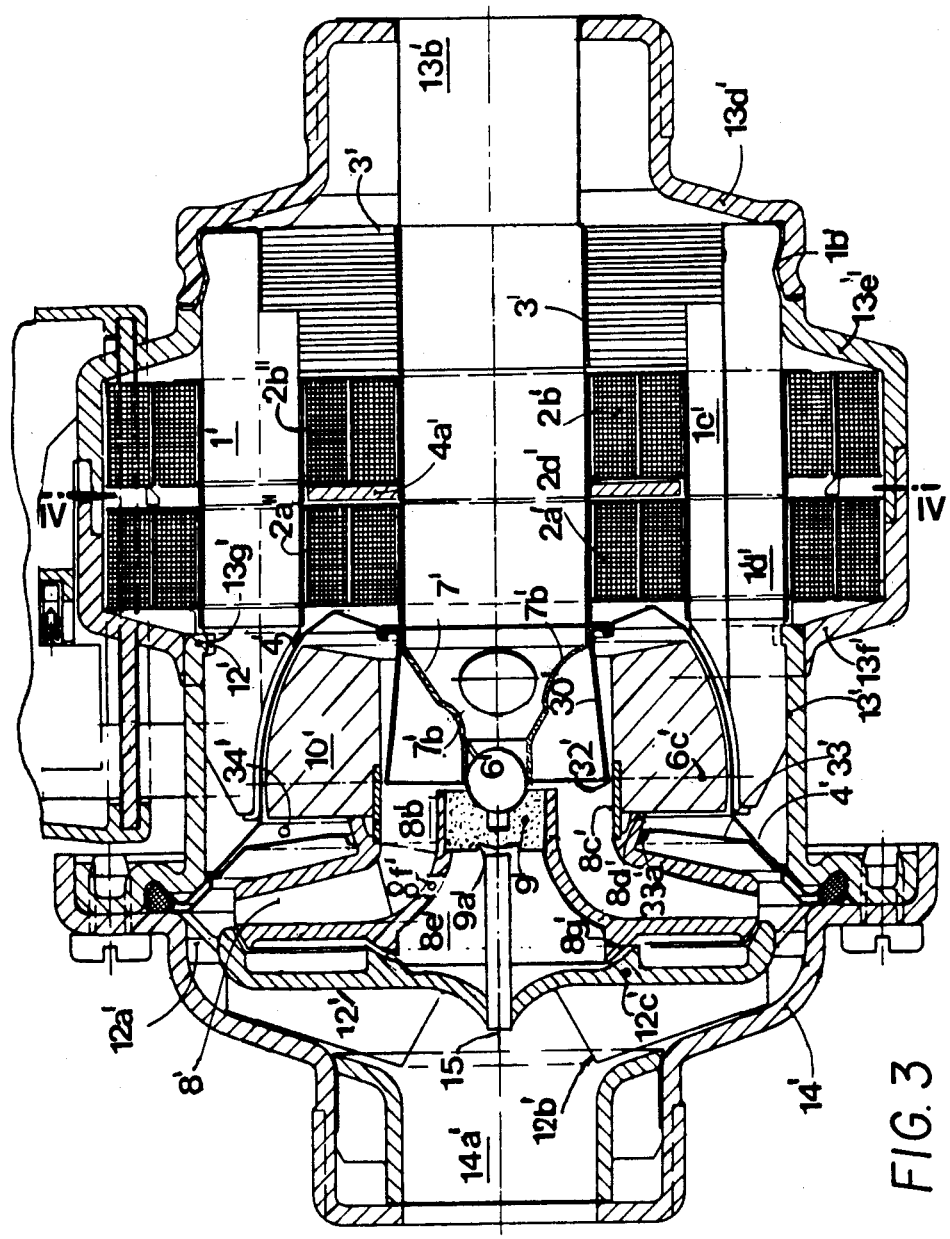
FIG. 3 shows a cross section through a pump-motor-unit whereby the pole pieces extend axially.

The pump, according to FIG. 3, differs from the design as shown in FIG. 1 by pole pieces 1' extending in an axial direction and arranged between the inlet opening 13b' and the rotor 10'. The rotor 10' is mounted to the impeller 8'. A concave bearing cap 9' forms on its backside a working clearance with the stub shaft 15'. The rim 9a' limits the angle of tilt. In the inlet region 8b' of the impeller 8', a ring 8c' forms the connecting element between the pivoted impeller 8' and the rotor 10'. The fluid enters the pump through the inlet opening 13b' and is guided through the yoke 3' and the windings 2a' and 2b'. Inside of the suction pipe 4a' is a liner 30' with a rim in the equatorial plane 6c'. This rim forms a narrow working clearance 32' with the ring 8c'. Furthermore, a pedestal 7' is mounted within said suction pipe 4a'. On this pedestal 7' a bearing ball 6' is clamped. This pedestal 7' has enough openings 7b' to permit a practically unobstructed flow of the fluid through the inlet region 8b'. The impeller 8' includes spherical ring portion 8d'. A narrow working clearance 33a' is maintained between a stationary ring 33' and said ring portion 8d' to prevent entrance of dirt particles into the chamber 34' in which the rotor 10' rotates.

On the pressure side of the impeller 8' is a stationary guide wheel 12' with bucket rings 12a' and 12b' to convert the whirl into pressure and to guide the fluid to the outlet opening 14a' of the pump housing 14'. A ring portion 12c' of the guide wheel 12' forms a spherical space with the ring portion 8g' of the impeller 8', enclosing the chamber 8e'. Said chamber 8e' is connected to the suction side by a channel 8f'. The wet compartment of the pump is separated by the separation wall 4' from the dry compartment containing the stator 1', 2a', 2b', 3'. The magnetic conductive part of the stator consists of a group of pole pieces 1', equally distributed around the separation wall 4' and magnetically connected by the yoke 3'. The coils 2a' and 2b' are arranged around the suction pipe 4a' and in good thermal conductive contact with this suction pipe 4a'. The pole pieces 1' are pressed against the spherical portion of the separation wall 4' by the ring shaped wall 13'. The rim 13g' of the ring shaped wall 13' is bent inward to fit into indentations 12' in the pole pieces 1' to restrain movement in the axial directions. On the suction side of the pump, the housing consists of a cap 13d' which is also interlinked with the pole pieces 1' around the indentation 1b'. Forces of the external piping installation will therefore be absorbed by the pole pieces 1'. The coils 2a' and 2b' are covered by two plastic ring portions 13e' and 13f'.

Figure 4:
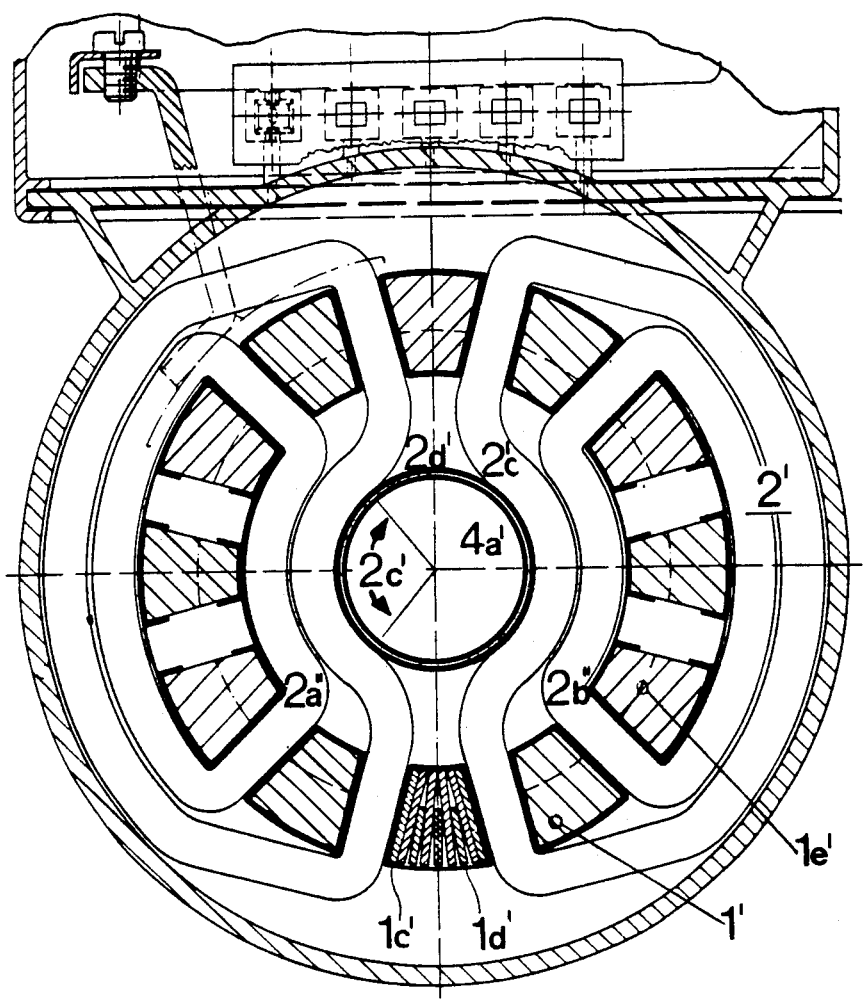
FIG. 4 shows a cross section through the dotted line IV—IV in FIG. 3.

FIG. 4 shows a cross section through the design shown in FIG. 3 along the dotted line IV—IV. The pole pieces form stacks consisting of a first group of sheet metal strips 1c', radially extending over the whole depth of the pole pieces 1' and a second group of sheet metal strips 1d', ending at the dotted line 1e'. The winding 2' follows the outer circumference of the suction pipe 4a' in the region 2c'. A copper ring 2d' lies between the two layers of coils 2a' and 2b' in good thermal contact with the inner portion 2a'' and 2b'' of the coils and the suction pipe 4a'.

I claim:

1. A canned pump-motor-unit, whose motor consists of a stator and a rotor, the stator being separated from the rotor by a magnetically permeable separation wall, and whose pump consists of an impeller and a pump housing, the impeller forming a unit with the rotor of the motor, said pump-motor unit having co-axial through flow from one axial end to the other, whereby fluid enters a suction conduit, passes the rotor to an impellar inlet, accelerates within the impeller and finally exits the pumphousing, said unit's separation wall having a spherical portion which separates a wet part from a dry part of the pump, the motor having a stator with coils arranged in the dry part, said stator forming a spherical magnetic gap with the rotor, the rotor being built as a spherical ring made mainly of ferromagnetic metal, an inner bore of which forms a part of the suction conduit characterized in that
    (a) the impeller (8) being pivoted radially and axially in the direction of the suction side (13b);
    (b) the bearing consisting of a rotating spherical concave bearing cap (9) and a stationary spherical convex member (6) with a spherical sliding surface, the surface defining a center of rotation (6a);
    (c) said sliding bearing (6,9) being positioned within the bore (10a) of said rotor (10);
    (d) the diameter of the bearing (6,9) being considerably smaller than the diameter of the bore (10a) of the rotor (10);
    (e) the rotor (120) being mounted on the impeller (8);
    (f) the center of rotation (6a) being positioned between the two axial ends of the spherical portion of the separation wall (4);
    (g) the separation wall (4) being funnel-shaped with increasing diameter from the small diameter part forming a suction conduit (4e) to maximum diameter in the equatorial plane (6c) containing the center of rotation (6a);
    (h) the spherical convex member (6) of the bearing being fixed on a stationary pedestal (7) located in the suction conduit (4e, 13b);
    (i) said pedestal (7) allowing almost free throughflow of the fluid conveyed; and
    (j) the coils (2a, 2b, 2c) being arranged around the separation wall (4), a considerable part of the coils being in thermal contact with said separation wall (4).

2. Canned pump-motor unit according to claim 1, characterized by a separation wall (4) consisting of a tapering region (4b), a cylindrical region (4c) and a spherical region (4d) having a larger inner diameter than the cylindrical region (4c).

3. Canned pump-motor unit according to claim 1, characterized by a separation wall (4) consisting of a tapering (4b), a cylindrical region and a spherical region (4d) having a larger inner diameter than the cylindrical region (4c).

4. Canned pump-motor unit according to claim 1, characterized by a rotor (10) with a bore (10a) having an axial dimension (10b) of the iron part approximating the diameter of the bore (10a).

5. Canned pump-motor unit according to claim 1, characterized by a rotor (10) having a cylindrical section (10c) extending on both sides of the equatorial plane (6c).

6. Canned pump-motor unit according to claim 1, characterized by a guide wheel (12) with two bucket rings (12a and 12b) fixed between the pump housing (14) and the tapering region (4b) of the separation wall (4).

7. Canned pump-motor unit according to claim 1, characterized by a rotor (10') fixed to an impeller (8'), with a groove between the rotor (10') and impeller (8') into which a stationary ring (33') fits, the inside edge of which seals to the rotor-impeller unit (8',10').

8. Canned pump-motor unit according to claim 1, characterized in that inside of said conduit (4a') a liner (30') is fixed, its rim forming a narrow clearance (32') with the inner surface of the bore of the rotor (10') in the equatorial plane (6c').

9. Canned pump-motor unit according to claim 1, characterized in that a stationary stub shaft (15) forms a working clearance (15a) with the back side of the rotating bearing cap (9).

10. Canned pump-motor unit according to claim 8, characterized in that the back side of the spherical bearing cap (9') has a rim (9a') limiting the tilt angle of the rotor-impeller-unit (8',10').

11. Canned pump-motor unit according to claim 8, characterized in that a freely rotating ring (16) is mounted between a fixed portion (15) of the pump and the rotating portion (8), whereby the clearance (16a) between the ring (16) and the fixed portion (15) or rotating portion (8) limits the tilt angle.

12. Canned pump-motor unit according to claim 1, characterized in that the coils (2a,2b,2c,2a',2b') are arranged around the separation wall (4,4') in good thermal contact with said separation wall (4,4').

13. Canned pump-motor unit according to claim 1, characterized in that pole pieces (1) have an inner rim which follows the outer side of the spherical region (4d) of the separation wall (4) and an outer rim formed by edges (1a) lying in a plane of rotation.

14. Canned pump-motor unit according to claim 12, characterized in that the edges (1a) of the pole pieces (1)

are in magnetic contact with a yoke (3) consisting of a spirally wound sheet-metal strip.

15. Canned pump-motor unit according to claim 1, characterized in that the motor housing (13) is cup shaped with an inlet flange (13a) and a slot for a retaining ring (21) near its outer rim.

16. Canned pump-motor unit according to claim 14, characterized in that the tapering area (4b) of the separation wall (4) is supported by a conical ring (20).

17. Canned pump-motor unit according to claim 2, characterized in that the ring portion (12c') of the guide wheel (12') forms a spherical gap with the ring portion (8d') of the impeller (8') enclosing the chamber (8e') which is connected to the suction side of the impeller by hole (8f'). Canned pump-motor unit according to claim 1 with a spherical bearing (6,9), consisting of a bearing cap (9) and a ball (6) which ball has a groove (6b) and a pedestal (7) clamping the ball by a ring-shaped shell (7a) crimped into the groove (6b).

18. Canned pump-motor unit according to claim 1, wherein said spherical convex member (6) has a groove (6b), and said pedestal (7) clamps said member by a ring-shaped shell (7a) crimped into said groove.

* * * * *